United States Patent [19]

Kiehn

[11] 4,289,404

[45] Sep. 15, 1981

[54] LASER-BASED DEFLECTION MEASURING METHOD AND APPARATUS

[75] Inventor: Robert M. Kiehn, Luling, Tex.

[73] Assignee: Standard Oil Company (Indiana), Chicago, Ill.

[21] Appl. No.: 79,286

[22] Filed: Sep. 27, 1979

[51] Int. Cl.$^3$ ............................................. G01B 9/02
[52] U.S. Cl. .................. 356/351; 350/400; 331/94.5 C
[58] Field of Search ................. 356/350, 351, 373; 331/94.5 C; 350/157, 400, 403

[56] References Cited

U.S. PATENT DOCUMENTS

| | | | |
|---|---|---|---|
| 3,506,362 | 4/1970 | Doyle et al. | 356/351 |
| 3,786,681 | 1/1974 | Kiehn | 356/350 |
| 3,791,738 | 2/1974 | Newburgh | 350/157 |

Primary Examiner—R. A. Rosenberger

[57] ABSTRACT

A laser beam is passed through a naturally birefringent or optically active device contained within the laser cavity. The device is oriented so that its optical axis is parallel to the laser beam, thus producing no birefringence or optical activity in the cavity in the steady state. The slightest tilting of the birefringent, or optically active, element causes significant changes in the modes of excitation of the optical cavity which are detected by a photosensitive beat detector. Thus the deflection angle of the optical axis is measured directly in terms of a beat frequency. By combining Faraday or Fresnel-Fizeau effects with optical activity, quadrature mode operation of a ring-laser embodiment is achieved, and is used to improve signal stability and noise rejection.

28 Claims, 5 Drawing Figures

LASER-BASED DEFLECTION MEASURING METHOD AND APPARATUS

BACKGROUND OF THE INVENTION

This invention relates to rotational deflection measurement devices, and in particular to such devices employing intra-cavity laser modulators.

The oscillation frequencies of the various modes of a laser beam within a laser cavity can be modulated by the four fundamental optical effects which are: (1) the optical activity effect, (2) the Faraday effect, (3) the Fresnel-Fizeau effect, and (4) the birefringence effect. When a light transmissive or partially transmissive element is placed within a laser cavity, the element may be utilized to have a desired influence employing one or more of the above listed effects. At least two of the effects are needed to produce quadrature mode operation.

For example, in U.S. Pat. No. 3,506,362 issued to W. M. Doyle, et al on Apr. 14, 1970, there is disclosed the use of a single effect, that of a rotatable optical transmissive birefringent device within a laser cavity with its optical axis being parallel to the axis of rotation and perpendicular to the direction of the laser beam. With the Doyle arrangement, the laser oscillations are limited to linear polarization modes of excitation of the optical cavity and the effects measured by a rotation of the transmissive device are limited to those based on birefringence only. The Doyle arrangement provides for a natural birefringent splitting of the optical frequency modes present and the production of a beat frequency of the order of $10^8$ Hertz for zero deflection or rotation of the optically transmissive device used. Hence, accurate detection of a rotation as described in the Doyle patent requires a frequency stability of the optically transmissive device (as well as the laser) to one part in $10^8$. Such stability is extremely difficult if not impossible to achieve in view of ever present thermal gradients, stresses, electromagnetic effects, etc., which will all adversely affect the beat frequency stability. The Doyle arrangement is not a null measuring technique, but rather is used to compare two non-degenerate large numbers by subtracting the numbers to obtain a small difference—a technique well known in science to be fraught with error and noise problems. A null comparison device is much preferred since it measures the desired small quantity directly.

Another example of intra-cavity laser modulation is contained in U.S. Pat. No. 3,786,681 issued to Kiehn on Jan. 22, 1974. That patent discloses the use of a stress-birefringent optically active element placed in the path of a laser beam with the element's optical axis being parallel to the direction of the laser beam. The cylindrically shaped element is fixedly mounted at one end and adapted with a lever arm at the other end for applying a torque on the element. The resulting stress-birefringent optical activity effect causes the production of a frequency difference between a plurality of circular polarization modes. The torque applied is around the optical axis of the crystal. Additionally, the Kiehn patent discloses the use of a ring laser system employing more modes of operation than possible with the system of Doyle. When the element of the Kiehn patent is torqued about its optical axis, it causes variations in each of the modes of operation of the laser beam. By connecting suitable torquing mechanisms to the element, it is possible to produce frequency shifts in the laser operating modes which are directly proportional to gravity variations, pressure variations, accelerations, or other desired physical measurements.

The techniques disclosed in Doyle and Kiehn are very useful and suitable for some purposes, but they by no means exhaust the possibilities for accurate measurements made with intra-cavity laser modulators. In particular, the instant application discloses a very useful alternative technique for making sensitive measurements with laser beam modulators, and utilizes the fact that certain combinations of the effects described above will produce quadrature modes of operation in a ring laser.

SUMMARY OF THE INVENTION

Accordingly, the instant invention provides a novel technique of extreme sensitivity for measuring angular deflections. The invention comprises the positioning of an anisotropic optically active and optically transmissive modulating means in a rotatable support within the cavity of either a standard linear laser or a ring laser so that the laser beam passes through the modulating element parallel to the optical axis of the element when a zero angle of deflection is indicated. With this arrangement the mode frequencies of the laser beam only differ when the modulator is tilted. Circular polarization states are measured when a deflection occurs.

In one embodiment of the invention, a biasing element is included within the laser cavity to shift the operating points of the modes present to any desired range for matching with specific optical or electronic systems.

In a preferred embodiment, a Faraday mechanism or a Fresnel-Fizeau mechanism is also used in a ring laser cavity to produce quadrature modes of operation when used with an optically active transmissive element.

The mechanical support system is arranged so that when a force is applied to a lever or a similar device for transmitting rotary motion, the optical axis of the light transmissive modulating element is tilted slightly away from that of the laser beam so that the force or acceleration causing the movement can be measured in terms of the resulting frequency variations in the operating modes of the laser beam. The mechanical support system can be biased with springs or counter balances so that in the absence of an actuating force or movement, the modulating element will be "zeroed."

The element used to detect the variations comprises a photosensitive non-linear electronic device (e.g., a photo-diode) one or more of the outputs of which comprise difference or "beat" frequencies of the optical frequencies present in the laser beam.

BRIEF DESCRIPTION OF THE DRAWING

A more complete understanding of the instant invention may be obtained by reference to the following detailed description in conjunction with the drawing, wherein.

DETAILED DESCRIPTION

Figure 1:
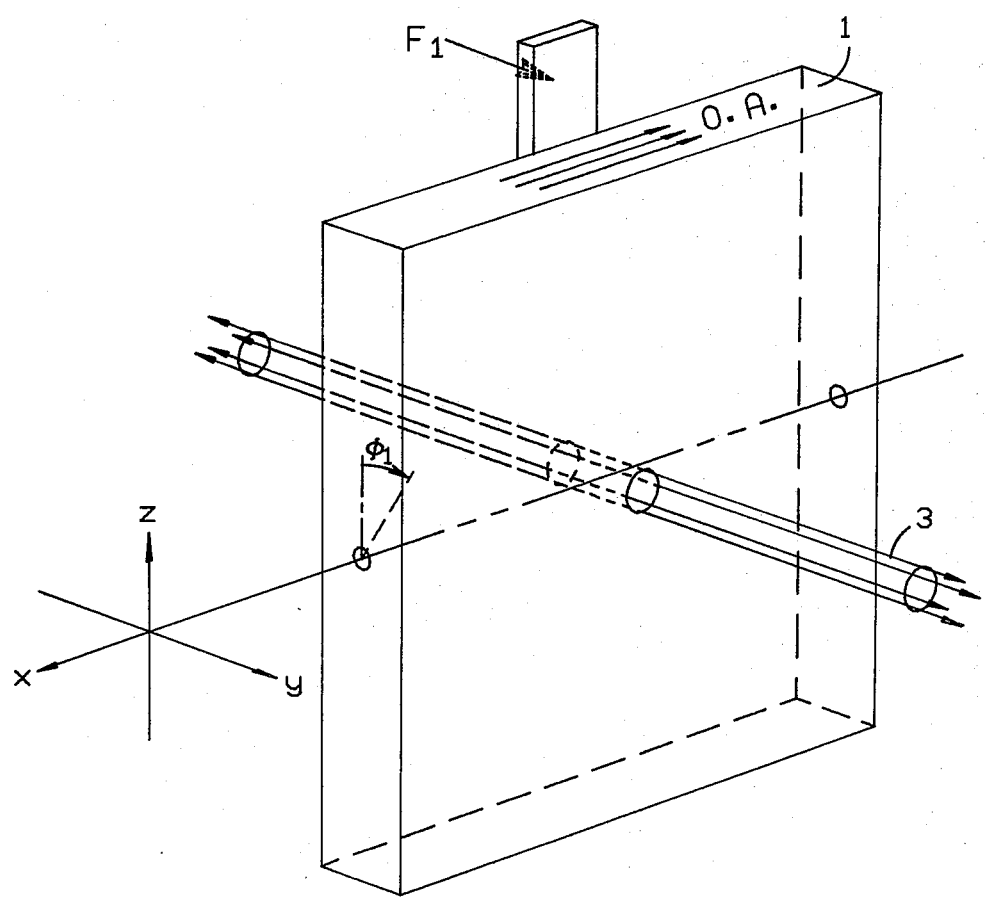
FIG. 1 shows an angular measurement technique of the prior art.

Turning now to FIG. 1, therein depicted is a laser beam modulator positioned to rotate about the x axis of an x, y, z right-handed Cartesian coordinate system. The optical axis (OA) of the optically transmissive modulator 1 exhibits an optical anisotropy with the optical axis thereof being as shown parallel to the axis of rotation of the modulator element 1. When a laser beam 3 is passed through the modulator 1 within a laser cavity, two frequencies of operation are activated. The difference between the two frequencies of operation is a function of the angle $\phi_1$ which describes the orientation of the modulator element about its axis of rotation x. Thus, for example, when $\phi_1 = 0$, a reference frequency difference between the two modes of operation is determined. Any rotation of the modulator 1 away from this reference position will cause a corresponding change in the frequency difference measured between the two modes of operation of the laser. This type of arrangement provides small variations of an already existing frequency difference to be used for the measurement of the deflection angle $\phi_1$. Hence, the accuracy of this technique is dependent upon the stability of the original reference frequency difference, which is subject to variations due to temperature and other effects; moreover, this arrangement does not enable quadrature modes of operation. A preferred technique would be to employ some sort of a null device which would produce a zero frequency difference in the modes of operation at a zero reference angle.

Figure 2:
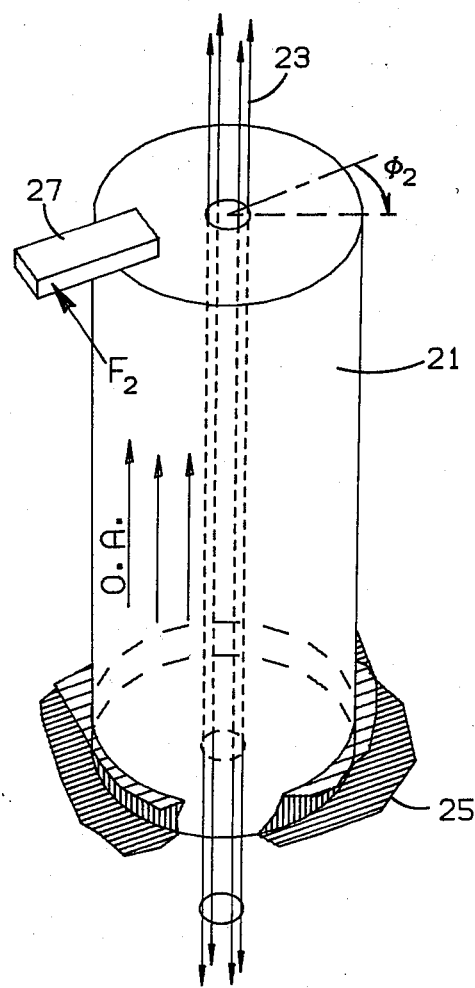
FIG. 2 shows a prior art technique for using stress birefringent properties to measure force or angular displacement.

Such a null device is known in the prior art as depicted in FIG. 2. Therein depicted is a cylindrical stress birefringent optically active element 21 with its optical axis as shown being parallel to the cylindrical axis of the element as well as being parallel to the direction of the laser beam 23 passing through it. The element is mounted at one end to a fixed plate 25 and is twisted at the other end by a force $F_2$ applied to a lever 27 attached to the crystal. In the absence of the force $F_2$ the element exhibits no birefringent, or optical activity, effect and as a result the laser beam 23 passing through it within a laser cavity is not caused to have modes of operation at differing frequency values. Upon the application of a force $F_2$, a plurality of laser modes is produced due to the resulting stress birefringent effect of the element, thus producing optical frequency of differing values, said differing values being detectable by means of a light-sensitive nonlinear electronic sensor (e.g., a photo-diode) not shown. The apparatus of FIG. 2 comprises a true null device, but it requires an actual stress to be applied to the element so that only extremely small values of angle $\phi_2$ can practically be measured. Thus, the apparatus of FIG. 2 is quite suitable for usage as a force or pressure measuring element, but is very limited for implementation as a deflection angle measuring tool.

Figure 3:
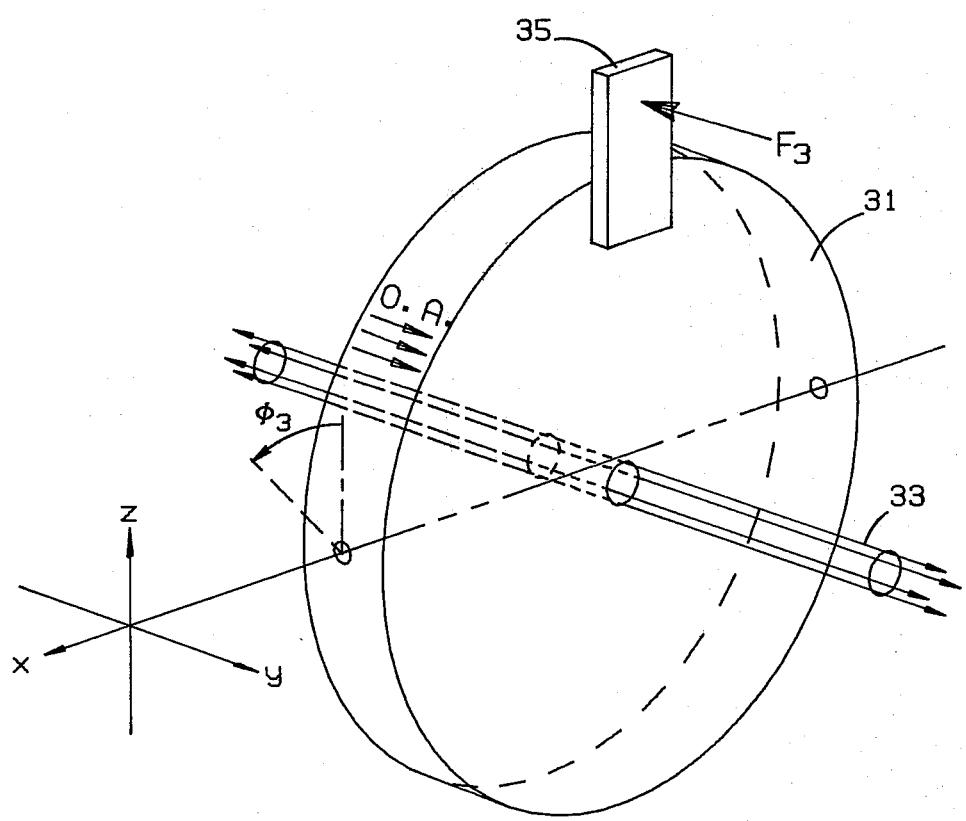
FIG. 3 shows an optical modulator according to the instant invention.

During his continuing research and study concerning laser modulation techniques, the applicant has discovered a new and useful method and apparatus for detecting and measuring angular displacements. This approach comprises the placement of a naturally birefringent or optically active crystal modulator element as shown in FIG. 3 within a laser cavity. As shown, the optical axis of the modulator element is positioned parallel to the direction of the modulated laser beam. A force $F_3$ applied to the lever element 35 causes the modulator element to be rotated about the x axis as shown, thus producing an angular displacement $\phi_3$. Such rotation of the modulator element 31 causes the modes of operation of the laser beam to become different in frequency. These differences are detectable by a light-sensitive electronic nonlinear detector (e.g., a photo-diode), not shown. The applicant has determined that this technique of modulation for determining angular displacement is superior to the techniques of the prior art, since this technique is a null measurement technique and since much larger angles of rotation are measurable while still using a nulling technique. Thus, for example, the practically attainable angle measurements can be much larger with the arrangement of the instant invention than with that of FIG. 2 while avoiding the disadvantages of the arrangement of FIG. 1.

The laser beam 33 can be either a dual mode linear laser beam or preferably a four-mode, or quadrature mode, ring laser beam. The use of the modulator 31 in a ring laser cavity is preferred, because of the significantly greater inherent frequency stability of a ring laser, especially when operated in the quadrature mode. Typically, a ring laser is a thousand times more stable with regard to relative frequency than a linear laser. Thus, the use of the modulator element of the instant invention within a ring laser cavity provides a much more stable and accurate method for angular deflection measurement than is attainable with the methods and apparatus of the above-described prior art. One of the preferred combinations comprises superimposing the optical activity and Faraday effects such that four modes may be generated in the ring laser cavity and the four quadrature signals may be mixed to improve stability and noise rejection. Such quadrature effect is not achievable with the Doyle arrangement.

Figure 4:
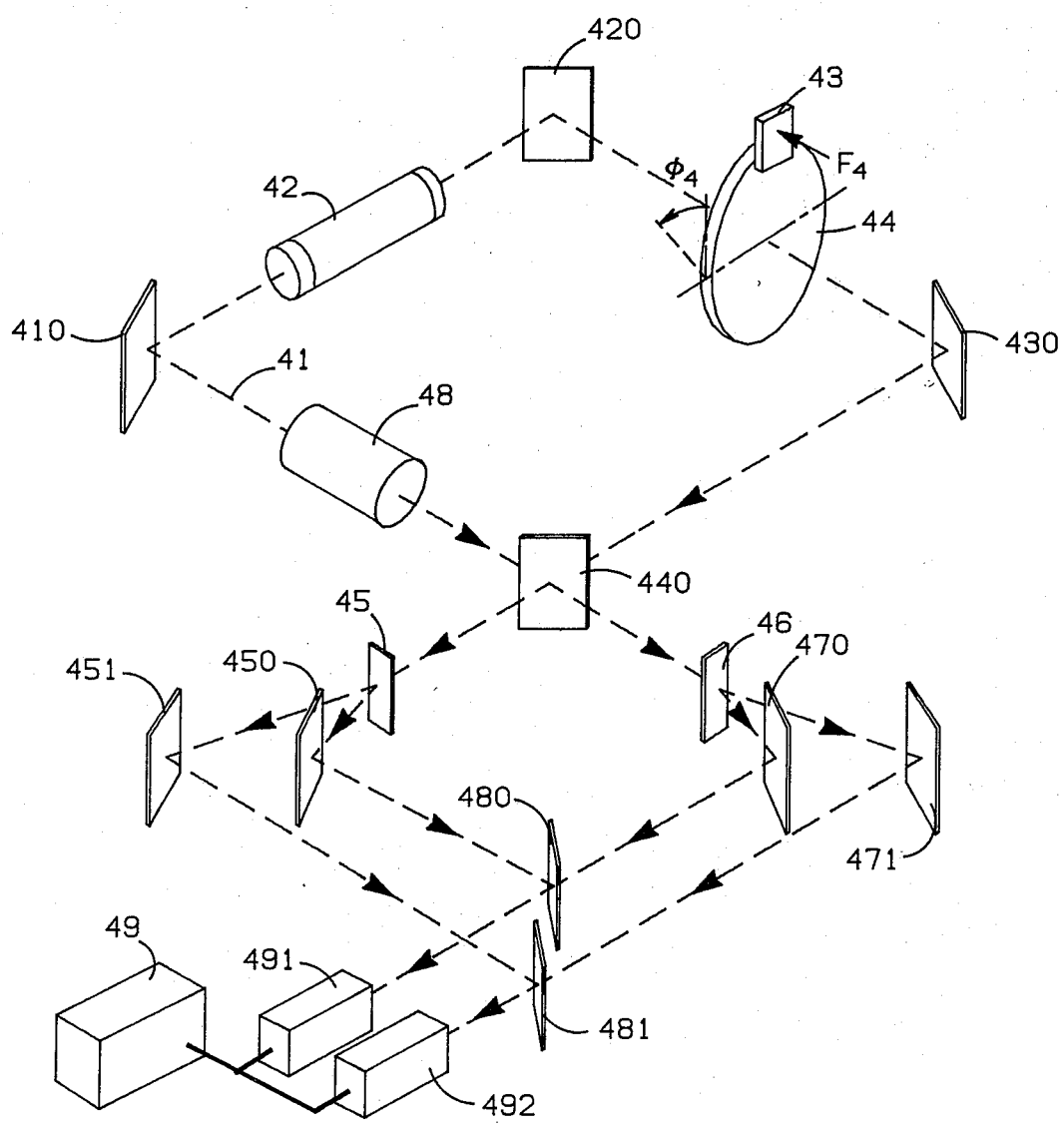
FIG. 4 shows an embodiment of the instant invention using a ring laser system.

FIG. 4 portrays an embodiment of the instant invention using a ring laser implementation. In that embodiment the mirrors 410, 420, 430, and 440 form the path for the ring laser beam 41, which is amplified by laser amplifier 42 and modulated by an element 44 substantially the same as that shown in FIG. 3. The lever 43 can be used to tilt the modulator 44 through an angle $\phi_4$ as shown by force $F_4$. Any of a large number of well-known mechanical apparatus may be used for accomplishing this tilting. Mirror 440 is only partially silvered so that a portion of the optical energy of ring laser beam 41 is enabled to pass through it from both the clockwise and counterclockwise directions in the ring. The laser beam 41 is thus split into two beams, each containing multiple possible modes of operation. Polarization filters 45 and 46 separate out particular modes which are then reflected by mirrors 450, 451, 470, and 471 to and through partially silvered mirrors 480 and 481 so that pairs of beams impinge upon photosensitive beam detectors 491 and 492 which are used to determine the frequency difference between pairs of beams impinging upon mirrors 480 and 481. When the modulator element 44 is positioned such that its optical axis is parallel to the laser beam 41 (i.e., corresponding to $\phi_4 = 0$), the plurality of modes of operation of the system will all reduce to the same constant frequency, and thus no frequency difference will be detected by the beat detectors 491 and 492. The slightest tilting of the modulator element 44 will cause a beat frequency signal to be detected, which is directly proportional to the tilt angle $\phi_4$. If for some reason it is desired to have the zero deflection angle be represented by a constant nonzero beat frequency, a biasing element comprising a prestressed birefringent element or a Faraday biasing element or any other frequency shifting element may be inserted in the laser beam path within the laser cavity. This optional device is depicted in FIG. 4 as element 48. The Faraday element, or Fresnel-Fizeau element, also may be used in combination with optical activity to produce quadrature mode operation of the ring laser embodiment. The combination of two effects (excluding birefringence) is necessary to split the frequency degeneracy of the beams propagating either clockwise or counterclockwise, polarized with either left or right helicity. When split, all four optical modes have slightly different optical frequencies. The relative frequency differences between the quadrature modes are highly stable and are measured by counter 49. Thus, mixing of Faraday and optical activity effects may be used to produce four-mode, rather than two-mode, operation of the optical beams in the ring laser cavity. Only one of the six possible quadrature combinations is shown in FIG. 4. The quadrature signals may be mixed electronically to improve stability and reduce noise.

Figure 5:
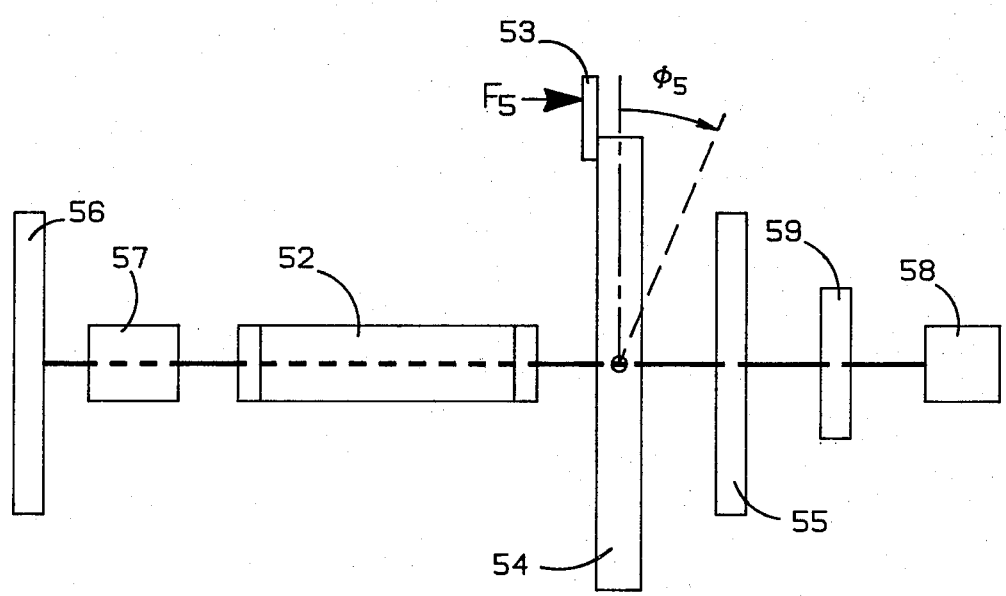
FIG. 5 shows a linear laser embodiment of the instant invention.

The instant invention, of course, can be implemented within the cavity of a linear laser as portrayed in FIG. 5. This configuration has all the advantages of the previously described embodiment with the exception of the inherent frequency stability of the ring laser. With this arrangement the mirrors 56 and 55 in conjunction with the laser amplifier 52 form a laser cavity for generating the linear laser beam 51. A modulating element 54 similar to that described in FIG. 3 is positioned within the laser cavity with its optical axis parallel to the axis of the laser beam. A lever mechanism 53 or other mechanical tilting apparatus is provided so that when a force $F_5$ is applied thereto the modulator element 54 is caused to rotate as shown to form an angle $\phi_5$. When the modulator element is thus tilted it causes the laser beam operating modes present to operate at differing frequencies. Mirror 55 is only partially silvered so that a portion of the optical energy is allowed to pass through it to be detected by beat detector 58 (as with the previous embodiment this beat detector typically comprises a nonlinear photosensitive electronic device). The beat frequency detected is directly proportional to the displacement angle $\phi_5$. An optional biasing element 57 such as a Faraday element or a Fresnel-Fizeau element may be added within the laser cavity, as with the previously described embodiment, to cause the beat detector 58 to produce a constant frequency output signal for a zero deflection angle $\phi_5$. Thus, both the embodiments shown in FIG. 4 and FIG. 5 are capable of being used as null instruments or as instruments operating about any desired frequency level.

It should be noted that the method and apparatus of the instant invention can be used to measure a variety of physical quantities (e.g., forces, pressures, gravity gradients, accelerations, etc.), depending upon the nature of the mechanical apparatus used to tilt the modulating element. Typical examples of these types of mechanical apparatus are described in U.S. Pat. No. 3,786,681, issued to Kiehn on Jan. 22, 1974.

It is to be understood that the scope of the instant invention is not limited to the particular embodiments described herein, or to any particular mechanical rotation system; rather, the invention is defined by the appended claims.

What is claimed is:

1. A displacement sensor comprising a laser including a plurality of reflectors which establish an optical path therebetween, one or more of said reflectors being partially light-transmissive;

a laser amplifier contained within said optical path for generating a laser beam therein;

an optically transmissive means disposed in said path, said optically transmissive means having an optical axis in a normal position parallel to the axis of said laser beam, and said optically transmissive means exhibiting optical anisotropy;

means responsive to an external force to displace said optical axis of said optically transmissive means from said normal position; and a photosensitive beat detector positioned to intercept radiant energy exiting from said optical path through one or more of said partially light-transmissive reflectors, for detecting one or more difference frequencies between different modes of operation of said laser beam, said one or more difference frequencies resulting from the displacement of said optical axis of said optically transmissive means from said normal position.

2. The sensor of claim 1 wherein said means for displacing said optically transmissive means comprises a device coupled to said optically transmissive means that rotates said optically transmissive means about an axis of rotation of said optically transmissive means perpendicular to said axis of said laser beam in response to a torque exerted upon said device.

3. The sensor of claim 1 wherein said means for displacing said optically transmissive means comprises a device coupled to said optically transmissive means that rotates said optically transmissive means about an axis of rotation of said optically transmissive means perpendicular to said axis of said laser beam in response to a linear displacement of said device.

4. The sensor of claim 1 wherein said optically transmissive means is supported for rotation about an axis that intersects and is perpendicular to the axis of rotation of said laser beam.

5. A sensor according to claims 1,2,3, or 4 wherein a biasing element is contained within the cavity of said laser whereby a constant frequency difference is produced between said different modes of operation of said laser beam when said optically transmissive means is in said normal position.

6. A sensor according to claim 5 wherein a Faraday element is positioned within said laser cavity.

7. A sensor according to claims 1 or 4 wherein a Faraday element is positioned within said laser cavity.

8. A method for measuring displacement comprising the use of a laser including a plurality of reflectors which establish an optical path therebetween, one or more of said reflectors being partially light-transmissive, including the steps of:

positioning a laser amplifier within said optical path for generating a laser beam therein;

placing an optically transmissive means in said path, said optically transmissive means having an optical axis in a normal position parallel to the axis of said laser beam, and said optically transmissive means exhibiting optical anisotropy;

supporting said optically transmissive means with means responsive to an external force to displace said optical axis of said optically transmissive means from said normal position; and positioning a photosensitive beat detector to intercept radiant energy exiting from said optical path through one or more of said partially light-transmissive reflectors, for detecting one or more difference frequencies between different modes of operation of said laser beam, said one or more difference frequencies resulting from the displacement of said optical axis of said optically transmissive means from said normal position.

9. The method of claim 8 wherein said means for displacing said optically transmissive means comprises a device coupled to said optically transmissive means that rotates said optically transmissive means about an axis of rotation of said optically transmissive means perpendicular to said axis of said laser beam in response to a torque exerted upon said device.

10. The method of claim 8 wherein said means for displacing said optically transmissive means comprises a device coupled to said optically transmissive means that rotates said optically transmissive means about an axis of rotation of said optically transmissive means perpendicular to said axis of said laser beam in response to a linear displacement of said device.

11. The method of claim 8 wherein said optically transmissive means is supported for rotation about an axis that intersects and is perpendicular to the axis of rotation of said laser beam.

12. The methods of claims 8 or 11 wherein a biasing element is positioned within the cavity of said laser, whereby a constant frequency difference is produced between said different modes of operation of said laser beam when said optically transmissive means is in said normal position.

13. The method of claim 12 wherein a Faraday element is positioned within said laser cavity.

14. The methods of claims 8 or 11 wherein a Faraday element is positioned within said laser cavity.

15. A displacement sensor comprising
a laser including a plurality of reflectors which establish an optical path for a ring laser beam, one or more of said reflectors being partially light-transmissive;
a laser amplifier contained within said optical path for generating said ring laser beam;
an optically transmissive means disposed in said path, said optically transmissive means having an optical axis in a normal position parallel to the axis of said ring laser beam, and said optically transmissive means exhibiting optical anisotropy;
means responsive to an external force to displace said optical axis of said optically transmissive means from said normal position; and
a photosensitive beat detector positioned to intercept radiant energy exiting from said optical path through one or more of said light-transmissive reflectors, for detecting one or more difference frequencies between different modes of operation of said ring laser beam, said one or more difference frequencies resulting from the displacement of said optical axis of said optically transmissive means from said normal position.

16. The sensor of claim 15 wherein said means for displacing said optically transmissive means comprises a device coupled to said optically transmissive means that rotates said optical axis of said optically transmissive means about an axis of rotation of said optically transmissive means perpendicular to said axis of said ring laser beam in response to a torque exerted upon said device.

17. The sensor of claim 15 wherein said means for displacing said optically transmissive means comprises a device coupled to said optically transmissive means that rotates said optically transmissive means about an axis of rotation of said optically transmissive means perpendicular to said axis of said ring laser beam in response to a linear displacement of said device.

18. The sensor of claim 15 wherein said optically transmissive means is supported for rotation about an axis of rotation that intersects and is perpendicular to the axis of said ring laser beam.

19. A sensor according to claims 15 or 18 wherein a biasing element is contained within the cavity of said laser whereby a constant frequency difference is produced between said laser different modes of operation of said ring laser beam when said optically transmissive means is in said normal position.

20. A sensor according to claims 15 or 18 further comprising means positioned within said laser cavity to produce quadrature modes of operation.

21. A sensor according to claim 20 wherein said means to produce quadrature modes of operation comprises an element selected from the group consisting of Faraday elements and Fresnel-Fizeau elements.

22. A method for measuring displacement comprising the use of a laser including a plurality of reflectors which establish an optical path for a ring laser beam, one or more of said reflectors being partially light-transmissive, including the step of:
positioning a laser amplifier within said optical path for generating said ring laser beam therein;
placing an optically transmissive means in said path, said optically transmissive means having an optical axis in a normal position parallel to the axis of said ring laser beam, and said optically transmissive means exhibiting optical anisotropy;
supporting said optically transmissive means with means responsive to an external force to displace said optical axis of said optically transmissive means from said normal position; and
positioning a photosensitive beat detector to intercept radiant energy exiting from said optical path through one or more of said partially light-transmissive reflectors, for detecting one or more difference frequencies between different modes of operation of said ring laser beam, said one or more difference frequencies resulting from the displacement of said optical axis of said optically transmissive means from said normal position.

23. The method of claim 22 wherein said means for displacing said optically transmissive means comprises a device coupled to said optically transmissive means that rotates said optically transmissive means about an axis of rotation of said optically transmissive means perpendicular to said axis of said ring laser beam in response to a torque exerted upon said device.

24. The method of claim 22 wherein said means for displacing said optically transmissive means comprises a device coupled to said optically transmissive means that rotates said optically transmissive means about an axis of rotation of said optically transmissive means perpendicular to said axis of said ring laser beam in response to a linear displacement of said device.

25. The method of claim 22 wherein said optically transmissive means is supported for rotation about an axis of rotation that intersects and is perpendicular to the axis of said ring laser beam.

26. The methods of claims 22 or 25 wherein a biasing element is positioned within the cavity of said laser, whereby a constant frequency difference is produced between said different modes of operation of said ring laser beam when said optically transmissive means is in said normal position.

27. The methods of claims 22 or 25 wherein means is positioned within said laser cavity to produce quadrature modes of operation.

28. The method of claim 27 wherein a Faraday or Fresnel-Fizeau element is positioned within said laser cavity to produce quadrature modes of operation.

* * * * *

UNITED STATES PATENT OFFICE
CERTIFICATE OF CORRECTION

PATENT NO. : 4,289,404
DATED : September 15, 1981
INVENTOR(S) : Robert M. Kiehn

It is certified that error appears in the above-identified patent and that said Letters Patent are hereby corrected as shown below:

Column 6, lines 38 and 39, after "axis" and before "that" insert --of rotation--.

Column 6, lines 39 and 40, after "axis" and before "of" delete --of rotation--.

Column 8, line 30, "step" should read --steps--.

Signed and Sealed this

Twenty-third Day of August 1983

[SEAL]

Attest:

Attesting Officer

GERALD J. MOSSINGHOFF

Commissioner of Patents and Trademarks

UNITED STATES PATENT OFFICE
CERTIFICATE OF CORRECTION

PATENT NO. : 4,289,404
DATED : Sept. 15, 1981
INVENTOR(S) : Robert M. Kiehn

It is certified that error appears in the above-identified patent and that said Letters Patent are hereby corrected as shown below:

Column 6, lines 38 and 39, after "axis" and before "that" insert --of rotation--; lines 39 and 40, after "axis" and before "of" delete --of rotation--.

Column 7, line 26, "claims 8 or 11" should read --any one of claims 8 through 11--; line 35, "claims 8 or 11" should read --any one of claims 8 through 11--.

Column 8, line 12, "claims 15 or 18" should read --any one of claims 15 through 18--; line 18, "claims 15 or 18" should read --any one of claims 15 through 18--; line 30, "step" should read --steps--.

Column 9, line 1, "claims 22 or 25" should read --any one of claims 22 through 25--; line 7, "claims 22 or 25" should read --any one of claims 22 through 25--.

Signed and Sealed this

Fifteenth Day of November 1983

[SEAL]

Attest:

GERALD J. MOSSINGHOFF

Attesting Officer   Commissioner of Patents and Trademarks